US011199914B2

(12) United States Patent
Parazynski et al.

(10) Patent No.: US 11,199,914 B2
(45) Date of Patent: *Dec. 14, 2021

(54) CAMERA AND SENSOR CONTROLS FOR REMOTELY OPERATED VEHICLES AND VIRTUAL ENVIRONMENTS

(71) Applicant: Fluidity Technologies Inc., Houston, TX (US)

(72) Inventors: Scott Edward Parazynski, Houston, TX (US); Brandon Tran, Lumberton, NJ (US); Radley Angelo, San Diego, CA (US); Austin Hill, San Diego, CA (US)

(73) Assignee: Fluidity Technologies Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,217

(22) Filed: Apr. 24, 2020

(65) Prior Publication Data
US 2020/0387239 A1    Dec. 10, 2020

Related U.S. Application Data

(63) Continuation of application No. PCT/US2018/057874, filed on Oct. 26, 2018, which
(Continued)

(51) Int. Cl.
*G06F 3/0346* (2013.01)
*G05G 9/047* (2006.01)
(Continued)

(52) U.S. Cl.
CPC ........... *G06F 3/0346* (2013.01); *G05G 9/047* (2013.01); *G06F 3/039* (2013.01); *G06F 3/0338* (2013.01);
(Continued)

(58) Field of Classification Search
CPC combination set(s) only.
See application file for complete search history.

(56) References Cited

U.S. PATENT DOCUMENTS 3,028,126 A   4/1962  Holleman
3,260,826 A   7/1966  Johnson
(Continued)

FOREIGN PATENT DOCUMENTS

CN    1310366 A    8/2001
CN  102346498 A    2/2012
(Continued)

OTHER PUBLICATIONS

Office Action for U.S. Appl. No. 13/797,184, dated Mar. 2, 2015, 16 pages.
(Continued)

*Primary Examiner* — Charles V Hicks
(74) *Attorney, Agent, or Firm* — Cooley LLP

(57) ABSTRACT

A hand controller that includes a control member mounted on a hand held base for commanding a remote vehicle or movement of a virtual object within a virtual environment includes an input device mounted for generating tilt commands for a sensor mounted on the remote vehicle or the virtual object, the input device being located on a front of the base and oriented to be displaced up and down to tilt the sensor or the virtual point of view when the base is held during operation.

24 Claims, 4 Drawing Sheets

Related U.S. Application Data is a continuation of application No. 16/163,565, filed on Oct. 17, 2018, now Pat. No. 10,331,233, which is a continuation-in-part of application No. 16/114,190, filed on Aug. 27, 2018, now Pat. No. 10,198,086, which is a continuation-in-part of application No. 15/964,064, filed on Apr. 26, 2018, now Pat. No. 10,520,973, which is a continuation-in-part of application No. 15/796,744, filed on Oct. 27, 2017, now Pat. No. 10,664,002.

(51) Int. Cl.
  *G06F 3/0338* (2013.01)
  *G06F 3/039* (2013.01)
  *G05G 5/03* (2008.04)
  *G05G 5/06* (2006.01)

(52) U.S. Cl.
  CPC .............. *G05G 5/03* (2013.01); *G05G 5/065* (2013.01); *G05G 2009/04707* (2013.01)

(56) References Cited

U.S. PATENT DOCUMENTS

| | | |
|---|---|---|
| 4,012,014 A | 3/1977 | Marshall |
| 4,216,467 A | 8/1980 | Colston |
| 4,420,808 A | 12/1983 | Diamond et al. |
| 4,584,510 A | 4/1986 | Hollow |
| 4,590,339 A | 5/1986 | Scott-Jackson et al. |
| 4,733,214 A | 3/1988 | Andresen |
| 5,042,314 A | 8/1991 | Rytter et al. |
| 5,127,608 A | 7/1992 | Farineau et al. |
| 5,128,671 A | 7/1992 | Thomas, Jr. |
| 5,223,776 A | 6/1993 | Radke et al. |
| 5,317,301 A | 5/1994 | DeVolpi |
| 5,459,382 A | 10/1995 | Jacobus et al. |
| 5,503,040 A | 4/1996 | Wright |
| 5,559,432 A | 9/1996 | Logue |
| 5,565,891 A | 10/1996 | Armstrong |
| D375,765 S | 11/1996 | Kawasaki |
| 5,607,158 A | 3/1997 | Chan |
| 5,617,515 A | 4/1997 | MacLaren et al. |
| 5,643,087 A | 7/1997 | Marcus et al. |
| 5,687,080 A | 11/1997 | Hoyt et al. |
| 5,694,153 A | 12/1997 | Aoyagi et al. |
| D389,198 S | 1/1998 | Hama |
| 5,749,577 A | 5/1998 | Couch et al. |
| 5,781,180 A | 7/1998 | Couch et al. |
| 5,831,408 A | 11/1998 | Jacobus et al. |
| 5,963,196 A | 10/1999 | Nishiumi et al. |
| H1822 H | 12/1999 | Kelley et al. |
| 6,024,576 A | 2/2000 | Bevirt et al. |
| 6,068,554 A | 5/2000 | Tyler |
| 6,198,471 B1 | 3/2001 | Cook |
| 6,201,196 B1 | 3/2001 | Wergen |
| 6,222,525 B1 | 4/2001 | Armstrong |
| 6,429,849 B1 | 8/2002 | An et al. |
| 6,459,420 B1 | 10/2002 | Harris |
| 6,512,509 B1 | 1/2003 | McVicar |
| 6,580,418 B1 | 6/2003 | Grome et al. |
| 6,597,347 B1 | 7/2003 | Yasutake |
| 6,613,997 B2 | 9/2003 | Oster et al. |
| 6,614,420 B1 | 9/2003 | Han et al. |
| 6,624,806 B2 | 9/2003 | Hsu |
| 6,644,141 B2 | 11/2003 | Oikarinen |
| 6,664,946 B1 | 12/2003 | Stipes et al. |
| 6,865,342 B2 | 3/2005 | Hirata et al. |
| 7,131,889 B1 | 11/2006 | Hawkes |
| 7,170,420 B2 | 1/2007 | Phifer |
| 7,548,697 B2 | 6/2009 | Hudson et al. |
| 7,575,491 B1 | 8/2009 | Martin |
| 7,793,890 B2 | 9/2010 | Scherer |
| 7,823,685 B2 | 11/2010 | Blind |
| 7,931,239 B2 | 4/2011 | Pedersen et al. |
| 8,089,225 B2 | 1/2012 | Goossen |
| 8,100,218 B2 | 1/2012 | Case et al. |
| 8,212,770 B2 | 7/2012 | Obourn et al. |
| 8,258,917 B2 | 9/2012 | Cai et al. |
| 8,276,476 B2 | 10/2012 | Diccion |
| 8,300,012 B2 | 10/2012 | Yamamoto |
| 8,344,914 B2 | 1/2013 | Yeh |
| 8,345,004 B1 | 1/2013 | Kass et al. |
| 8,371,187 B2 | 2/2013 | Payandeh et al. |
| 8,380,402 B2 | 2/2013 | Hobenshield |
| D678,281 S | 3/2013 | Yung |
| 8,576,168 B2 | 11/2013 | Kabasawa et al. |
| 8,716,973 B1 | 5/2014 | Lammertse |
| 8,829,894 B2 | 9/2014 | Banerjee et al. |
| 8,866,597 B2 | 10/2014 | Brendel |
| 8,881,616 B2 | 11/2014 | Dize et al. |
| 8,887,597 B2 | 11/2014 | Black |
| 9,201,514 B1 | 12/2015 | Brandt |
| 9,501,084 B1 | 11/2016 | Bannister |
| 9,504,912 B2 | 11/2016 | Ikeda et al. |
| 9,547,380 B2 | 1/2017 | Parazynski |
| 9,727,076 B2 | 8/2017 | Smith |
| 10,133,271 B2 | 11/2018 | Hutson |
| 10,152,853 B2 | 12/2018 | Provancher et al. |
| 10,198,086 B2 | 2/2019 | Parazynski et al. |
| 10,222,794 B2 | 3/2019 | Deng et al. |
| 10,324,487 B2 | 6/2019 | Parazynski et al. |
| 10,324,540 B1 | 6/2019 | Parazynski |
| 10,331,232 B2 | 6/2019 | Parazynski et al. |
| 10,331,233 B2 | 6/2019 | Parazynski et al. |
| 10,481,704 B2 | 11/2019 | Parazynski et al. |
| 10,520,973 B2 | 12/2019 | Parazynski et al. |
| 10,664,002 B2 | 5/2020 | Parazynski |
| 10,921,904 B2 | 2/2021 | Parazynski et al. |
| 2002/0128064 A1 | 9/2002 | Sobota |
| 2002/0148715 A1 | 10/2002 | Oster et al. |
| 2003/0006956 A1 | 1/2003 | Wu et al. |
| 2003/0058219 A1 | 3/2003 | Shaw |
| 2003/0214484 A1 | 11/2003 | Haywood |
| 2004/0083940 A1 | 5/2004 | Shelton et al. |
| 2005/0104742 A1 | 5/2005 | Phifer |
| 2005/0159850 A1 | 7/2005 | Melman |
| 2005/0002774 A1 | 12/2005 | Watanachote |
| 2006/0137931 A1 | 6/2006 | Berg et al. |
| 2006/0156848 A1 | 7/2006 | Gosselin et al. |
| 2006/0164383 A1 | 7/2006 | Machin et al. |
| 2006/0224280 A1 | 10/2006 | Flanigan et al. |
| 2006/0262000 A1 | 11/2006 | Strong |
| 2007/0080934 A1 | 4/2007 | Chen et al. |
| 2007/0156286 A1 | 7/2007 | Yamauchi |
| 2008/0000634 A1 | 3/2008 | Hudson et al. |
| 2008/0132334 A1 | 6/2008 | Nonaka et al. |
| 2008/0174550 A1 | 7/2008 | Laurila et al. |
| 2008/0278448 A1 | 11/2008 | Nilsagard et al. |
| 2009/0152782 A1 | 6/2009 | Larson et al. |
| 2009/0179869 A1 | 7/2009 | Slotznick |
| 2009/0213073 A1 | 8/2009 | Obermeyer et al. |
| 2009/0248220 A1 | 10/2009 | Ecton et al. |
| 2010/0097309 A1 | 4/2010 | Nishida et al. |
| 2010/0302017 A1 | 12/2010 | Gugllelmo |
| 2011/0088961 A1 | 4/2011 | Case et al. |
| 2011/0148667 A1 | 6/2011 | Yeh |
| 2011/0213384 A1 | 9/2011 | Jeong |
| 2011/0219899 A1 | 9/2011 | Dize et al. |
| 2012/0187238 A1 | 7/2012 | Lam |
| 2012/0249455 A1 | 10/2012 | Nagata et al. |
| 2013/0147611 A1 | 6/2013 | Brendel |
| 2013/0178293 A1 | 7/2013 | Nakayama et al. |
| 2013/0293362 A1 | 11/2013 | Parazynski |
| 2014/0083225 A1 | 3/2014 | Downs et al. |
| 2014/0247119 A1 | 9/2014 | Robbins et al. |
| 2014/0249695 A1 | 9/2014 | Gettings et al. |
| 2015/0253801 A1 | 9/2015 | Wuisan et al. |
| 2016/0077589 A1 | 3/2016 | Chataignier et al. |
| 2016/0195939 A1 | 7/2016 | Parazynski |
| 2016/0241767 A1 | 8/2016 | Cho et al. |
| 2017/0121000 A1 | 5/2017 | Forslund et al. |
| 2017/0133175 A1 | 5/2017 | Lin et al. |
| 2017/0175884 A1 | 6/2017 | Watanabe |

(56) References Cited

U.S. PATENT DOCUMENTS

| | | |
|---|---|---|
| 2017/0233983 A1 | 8/2017 | Wright |
| 2017/0246533 A1 | 8/2017 | LaChappell et al. |
| 2017/0269587 A1 | 9/2017 | Hong |
| 2018/0164799 A1 | 6/2018 | Hong |
| 2018/0356907 A1 | 12/2018 | Parazynski et al. |
| 2019/0025869 A1 | 1/2019 | Parazynski |
| 2019/0033987 A1 | 1/2019 | Parazynski et al. |
| 2019/0041891 A1 | 2/2019 | Parazynski et al. |
| 2019/0041894 A1 | 2/2019 | Parazynski et al. |
| 2019/0042003 A1 | 2/2019 | Parazynski et al. |
| 2019/0042004 A1 | 2/2019 | Parazynski et al. |
| 2019/0071167 A1 | 3/2019 | Selwa et al. |
| 2019/0243468 A1 | 8/2019 | Parazynski et al. |
| 2020/0285326 A1 | 9/2020 | Parazynski et al. |
| 2020/0387238 A1 | 12/2020 | Parazynski et al. |
| 2020/0393865 A1 | 12/2020 | Parazynski et al. |
| 2021/0011561 A1 | 1/2021 | Parazynski et al. |
| 2021/0173391 A1 | 6/2021 | Parazynski et al. |

FOREIGN PATENT DOCUMENTS

| | | |
|---|---|---|
| CN | 102824746 A | 12/2012 |
| CN | 108885452 A | 11/2018 |
| GB | 2091423 A | 7/1982 |
| JP | H11-154031 | 6/1999 |
| WO | WO 2007/055606 | 5/2007 |
| WO | WO 2019/122926 | 6/2019 |

OTHER PUBLICATIONS

Office Action for U.S. Appl. No. 13/797,184, dated Oct. 16, 2015, 15 pages.
Office Action for U.S. Appl. No. 15/071,624, dated May 17, 2016, 20 pages.
Office Action for U.S. Appl. No. 15/394,490, dated Nov. 21, 2018, 10 pages.
Office Action for U.S. Appl. No. 16/682,509, dated Jul. 20, 2020, 11 pages.
Office Action for U.S. Appl. No. 15/796,744, dated Dec. 21, 2018, 8 pages.
Office Action for U.S. Appl. No. 15/796,744, dated Aug. 7, 2019, 21 pages.
First Office Action for Chinese Application No. 201780080619.X, dated Mar. 16, 2020, 15 pages.
International Search Report and Written Opinion for International Application No. PCT/US2017/058905, dated Feb. 23, 2018, 5 pages.
Office Action for U.S. Appl. No. 15/964,064, dated Mar. 18, 2019, 11 pages.
International Search Report and Written Opinion for International Application No. PCT/US2018/057862, dated Jan. 11, 2019, 15 pages.
Office Action for U.S. Appl. No. 16/163,561, dated Dec. 11, 2018, 13 pages.
International Search Report and Written Opinion for International Application No. PCT/US2018/057864, dated Feb. 26, 2019, 14 pages.
Office Action for U.S. Appl. No. 16/163,563, dated Dec. 12, 2018, 22 pages.
International Search Report and Written Opinion for International Application No. PCT/US2018/057865, dated Jan. 4, 2019, 10 pages.
Office Action for U.S. Appl. No. 16/163,565, dated Dec. 19, 2018, 39 pages.
International Search Report and Written Opinion for International Application No. PCT/US2018/057874, dated Jan. 10, 2019, 10 pages.
"Feel Your Drone With MotionPilot's Haptic Joystick", Engadget, https://www.engadget.com/2018/01/19/motionpilothaptic-drone-joystick/, dated Jan. 19, 2018.
"CES 2018: TIE Develop World's First One-Hand Drone Controller System," LiveAt PC.com, https://liveatpc.com/ces-2018-tie-develops-worlds-first-one-hand-drone-controller-system/, dated Jan. 2018.
"[Review] JJRC H37 Baby Elfie: Is it a Worthy Successor?" DronesGlobe, http://www.dronesglobe.com/review/baby-elfie/, dated Oct. 7, 2017.
"Learn How to Pilot in Less Than 2 Minutes", Wepulsit, http://www.wepulsit.com/, dated 2017.
"InnovRC Firmware v1.2", InnovRC, http://www.innovrc.de/ivrcwiki/index.php?title=Hauptseite, dated Mar. 2013.
"H.E.A.R.T.—Hall Effect Accurate Technology: A Unique 3D Technological Innovation Built Into the New Thrustmaster Joystick," Thrustmaster, http://www.thrustmaster.com/press/heart-hall-effect-accurate-technology-unique-3d-technological-innovation-built-new-thrustmaste, dated Jan. 7, 2009.
Pamplona, V. F. et al., "The image-based data glove," Proceedings of the 10th Symposium on Virtual and Augmented Reality, (SVR'2008), Joao Pessoa, Brazil, 2008, 204-211.
Wilbert, J. et al., "Semi-robotic 6 degree of freedom positioning for intracranial high precision radiotherapy; first phantom and clinical results," Radiation Oncology, 5(42), 11 pages, May 26, 2010.
Zhai, X., "Human performance in six degree of freedom input control," Doctoral Dissertation University of Toronto, Graduate Department of Industrial Engineering, 179 pages, 1995.
Office Action for U.S. Appl. No. 16/682,509, dated Mar. 16, 2021, 26 pages.
Extended European Search Report for European Application No. 17865929.8, dated Nov. 13, 2020, 9 pages.
Office Action for U.S. Appl. No. 16/858,202, dated Dec. 30, 2020, 7 pages.
Office Action for U.S. Appl. No. 16/858,212, dated Jan. 29, 2021, 7 pages.
Office Action for U.S. Appl. No. 17/110,576, dated Jan. 29, 2021, 25 pages.
International Search Report and Written Opinion for International Application No. PCT/US2020/063577, dated Apr. 14, 2021, 9 pages.
Partial Supplementary European Search Report for European Application No. 18871801.9, dated May 27, 2021, 15 pages.
First Office Action for Chinese Application No. 201880083427.9, dated Jun. 28, 2021, 13 pages.
Extended European Search Report for European Application No. 18870577.6, dated Jul. 23, 2021, 8 pages.
Extended European Search Report for European Application No. 18870040.5, dated Jun. 25, 2021, 9 pages.

CAMERA AND SENSOR CONTROLS FOR REMOTELY OPERATED VEHICLES AND VIRTUAL ENVIRONMENTS

CROSS-REFERENCE TO RELATED APPLICATIONS

This application is a continuation of International Patent Application No. PCT/US2018/057874, filed on Oct. 26, 2018, which is a continuation of U.S. patent application Ser. No. 16/163,565, filed on Oct. 17, 2018, now U.S. Pat. No. 10,331,233 which is a continuation-in-part of U.S. patent application Ser. No. 16/114,190, filed on Aug. 27, 2018, now U.S. Pat. No. 10,198,086, which is a continuation-in-part of U.S. patent application Ser. No. 15/964,064, filed on Apr. 26, 2018, now U.S. Pat. No. 10,520,973, which is a continuation-in-part of U.S. patent application Ser. No. 15/796,744, filed on Oct. 27, 2017, which claims the benefit of and priority to U.S. Provisional Patent Application No. 62/413,685, filed on Oct. 27, 2016, each of which is incorporated herein by reference in its entirety.

FIELD OF THE INVENTION

The present disclosure relates to controllers through which a person commands movement of a remote target augmented with a camera and other sensors, such as camera-carrying aerial drones and remotely operated underwater vehicles.

BACKGROUND OF THE INVENTION

Input devices or controllers, such as, joysticks, control columns, computer mice, cyclic sticks, foot pedals generate control inputs for a real or virtual target by sensing movement of one or more control members by a person that is commanding or controlling movement and operation of a target. These types of controllers have been used to control inputs for parameters such as to control pitch, yaw, and roll of the target, as well as navigational parameters such as translation (e.g., x-, y-, and z-axis movement) in a three-dimensional (3D) space, velocity, acceleration, and/or a variety of other command parameters. Examples of physical targets whose movement can be controlled remotely include aircraft such as aerial drones, submersible vehicles, robotic arms, industrial cranes and spacecraft. Examples of virtual targets whose movement can be controlled remotely include virtual and augmented reality simulations, computer aided design of 3-D objects and a wide range of computer games.

Typical drone, ROV and gaming controllers have two joy sticks mounted to a hand-held base for generating inputs for commanding movement and operation of a remote vehicle, as well as other inputs or controls for controlling operation of a camera on the remote vehicle.

SUMMARY

The present disclosure relates to improvements to controllers that are used by an operator to control movements of remote vehicles like aerial drones or other unmanned aircraft and spacecraft, submersible vessels, robotic arms, industrial cranes and similar targets that are being controlled remotely, and that have a steerable imaging sensor or other type of steerable sensor on a motorized mount that allow for a least tilting the sensor's orientation relative to the frame of reference of the remote target.

One aspect of the disclosure relates to orientation and positioning a mechanical input device on a controller for steering a sensor mounted on the target. Typical controllers for drones and other unmanned aerial vehicles of the type that are held by an operator have an off-axis rotary wheel that the operator turns to generate control inputs that tilt a video camera or other imagining sensor mounted on the drone. The rotary wheel is typically placed and oriented on the controller so that, if the operator's frame of reference is the drone's frame of reference, the wheel is rotated in plane that is orthogonal to the plane in which the camera tilts. It is common to forget which direction moves the camera up and which direction moves it down while operating such a controller. It is therefore relatively difficult to obtain imagery with conventional drone controllers owing to their non-intuitive input interfaces as well as the difficulty in readjusting movement rates while actively flying and acquiring imagery. The mechanical input device is oriented and positioned on the controller so that displacement of the input device corresponds to the movement of the sensor relative to the target when the controller is held in its normal operating position. In one embodiment, to tilt a sensor up and down on a target, an input device on the controller for generating a command or control input to tilt the sensor is oriented on the controller so that its displacement in a vertical plane relative to the user or pilot when the controller is in its normal, operational position and operated by the user results in generating a command to the target to tilt the sensor in the direction in which it the input device is displaced.

Such a controller can be adapted for controlling virtual environments, including movement of a view angle or point of view (POV) within a computer gaming or 3-D computer aided design (CAD) environment, as well as in virtual and augmented reality simulations. In one example, displacement of the input device results in a secondary control system moving a POV or simulated camera view relative to an asset moving within a virtual environment under the control of an operator in a manner that corresponds to the direction of movement of the input device by the user. Non-limiting examples of virtual environments include computer games, 3-D CAD, and virtual/augmented/mixed reality simulations.

A different aspect of the disclosure enables camera settings and speed adjustments for tilt and/or pan to be more easily adjusted "on the fly." Typical commercial drone controllers, for example, require the use of an application running on a computer (laptop, tablet, smartphone or similar device) to adjust camera and camera control settings. These settings are often buried deep within a series of nested menus, which tend to discourage their use, especially by those who are not expert videographers. Most drones have a relatively short battery life, and since difficult-to-access camera controls often involve stopping a flight so that the adjustments can be made, the amount of filming on any given flight can be quite limited.

In one representative embodiment, a rotary wheel or other input device on a base of controller allows toggling between functions to allow the camera or other sensor parameters to be adjusted, for example responsiveness of tilt and/or pan, shutter speed, exposure compensation, zoom and other functions that are otherwise typically only made available using nested menus in an interface to a software program associated with the controller.

Additional aspects, advantages, features and embodiments are described below in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application prevail.

DESCRIPTION OF ILLUSTRATIVE EMBODIMENTS

Figure 1A:
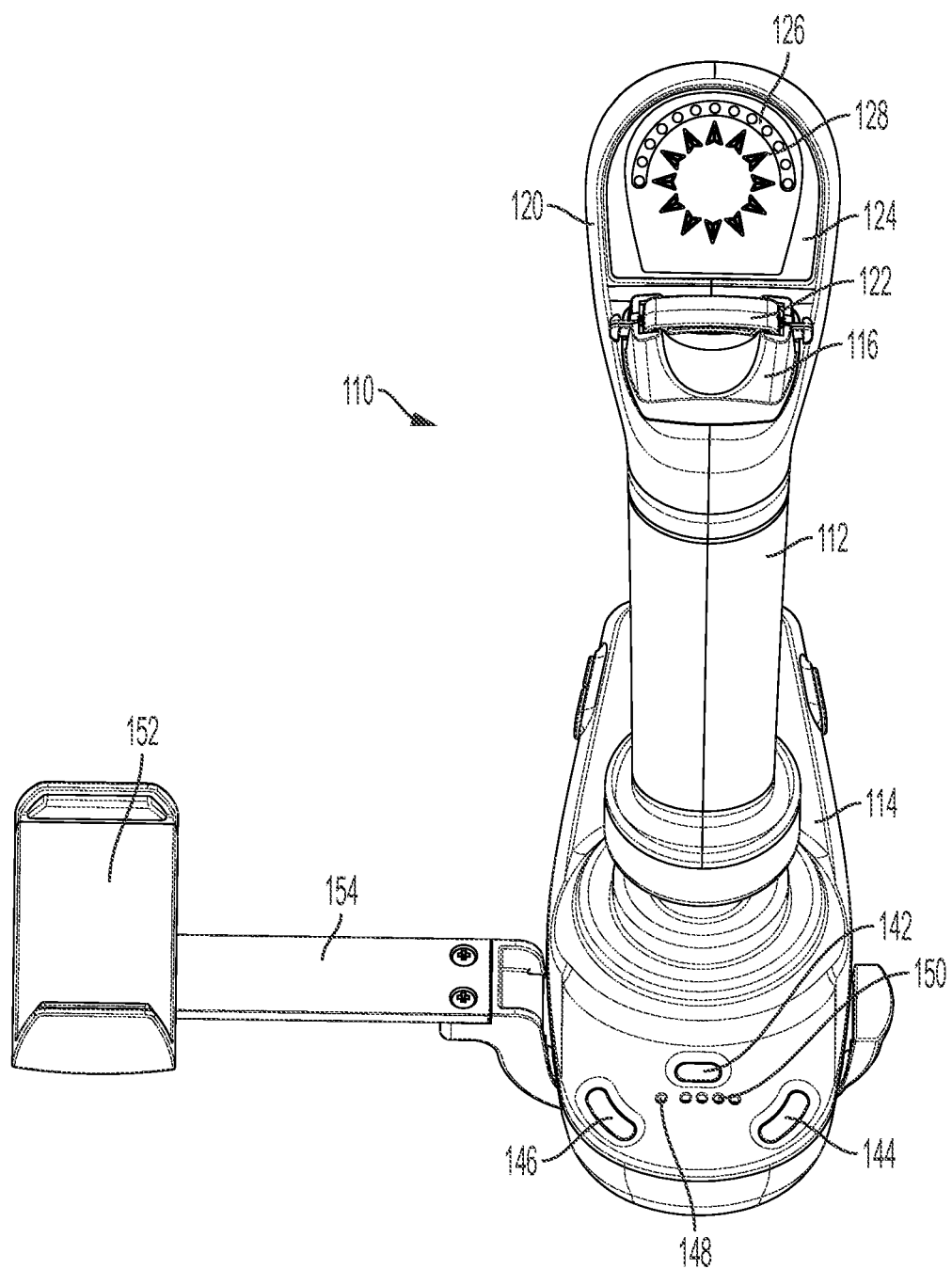
FIG. 1A is a rear perspective view of an exemplary hand controller capable of displaying target situational awareness information.
Figure 1B:
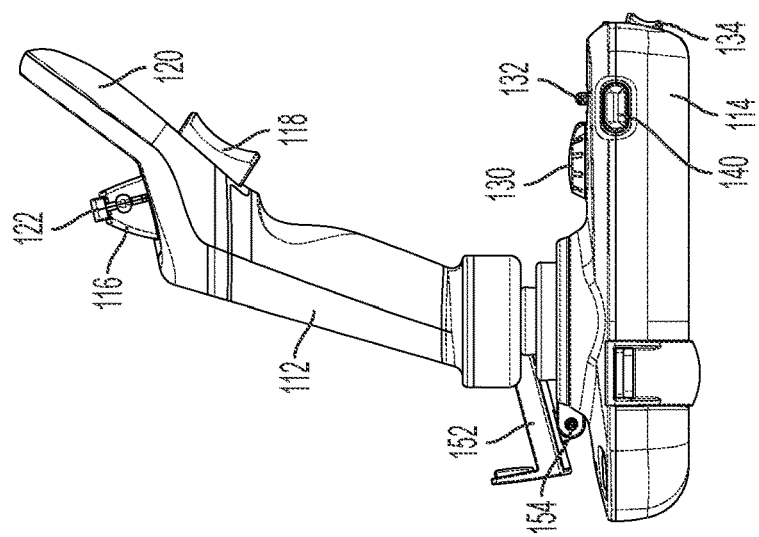
FIG. 1B is a front view of the hand controller of FIG. 1A.
Figure 1C:
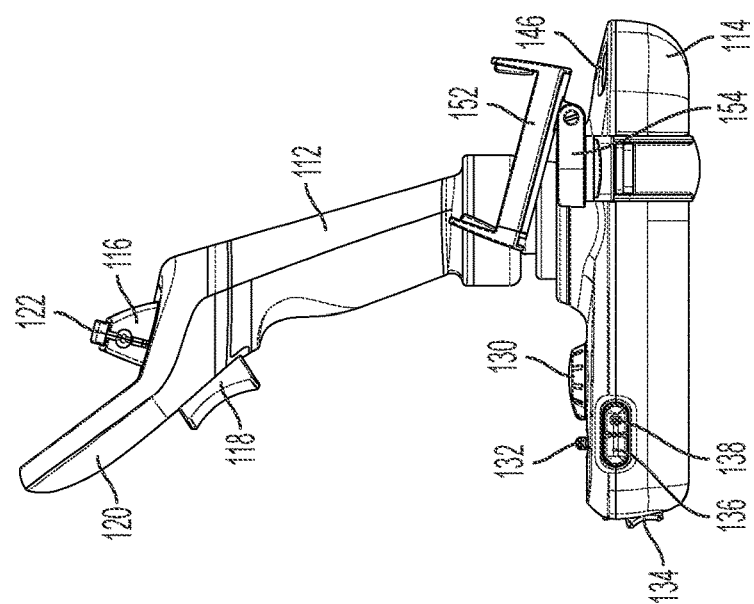
FIG. 1C is a left side view of the hand controller of FIG. 1A.
Figure 1D:
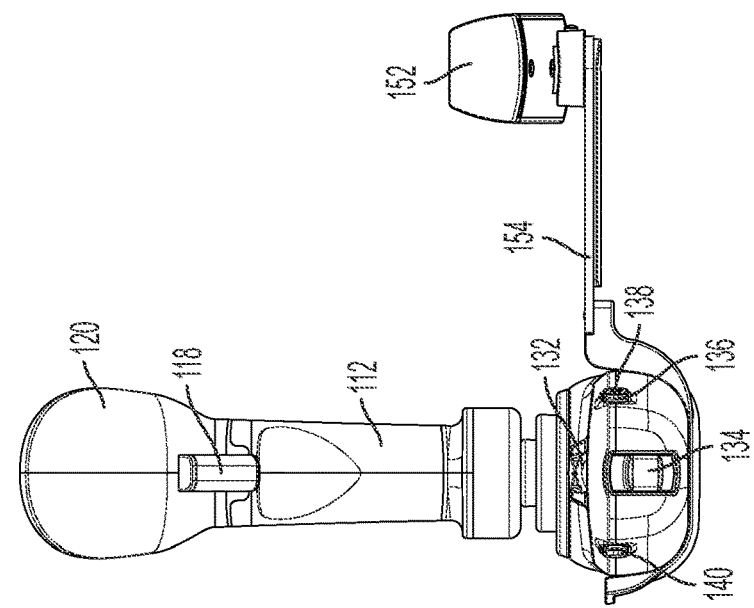
FIG. 1D is a right side view of the hand controller of FIG. 1A.
Figure 1E:
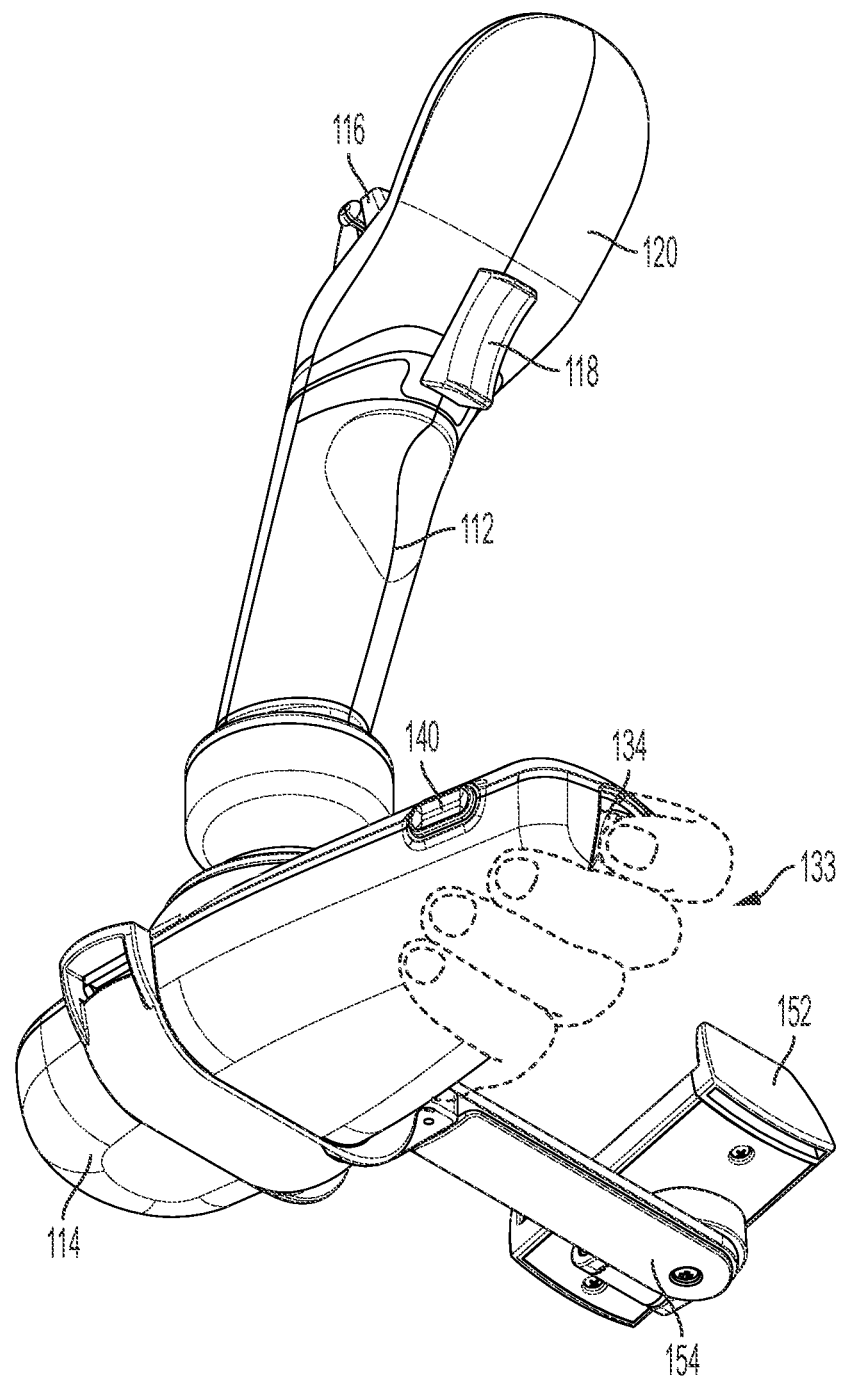
FIG. 1E is a bottom, front right perspective view of the hand controller of FIG. 1A.

For promoting an understanding of the principles of the invention that is claimed below, reference will now be made to the embodiments and examples illustrated in the appended drawings. By describing specific embodiments and examples, no limitation of the scope of the claimed subject matter, beyond the literal terms set out in the claims, is intended unless a definition for the terms is expressly given. Alterations and further modifications to the described embodiments and examples are possible while making use of the claimed subject matter, and therefore are contemplated as being within the scope of the subject matter that is claimed.

In the drawings and description that follows, the drawings are not necessarily to scale. Certain features of the invention may be shown in schematic form. Details or presence of conventional or previously described elements may not be shown in a figure in the interest of clarity and conciseness.

The present disclosure describes several embodiments of a control system or controller that allows a user to command using a single hand movement of a control target or point of reference (POR). The embodiments are representative, non-limiting examples of controllers having one or more control members that, when displaced by the user's hand or digits, generate a set of signals in each degree of freedom (DOF) of movement in which it is displaced. Each of these signals are then used to generate control inputs that are transmitted to a target control system. The controller maps the sensor signals to predetermined control inputs. The mapping can be, in one embodiment, changed or programmed so that the signal from any degree of freedom being commanded with the controller can be mapped to any control input for the target. Fewer than all of the degrees of freedom of the one or more controllers can be used if not required for the application; and one or more of the degrees of freedom of movement of the one or more controllers can be locked against movement, either temporarily or permanently, if not required for an application for which the controller is being used.

The control member may be mounted to a base or platform held or worn by the user, mounted on a tripod, or mounted on some other structure that acts as a frame of reference for measuring displacement of the first control member. The controller further includes signal conditioning circuits for interfacing sensors for measuring displacement of the control members, a processor for running software programmed processes, such as those described herein, a battery or other source for power, interfaces for other hardware, and transmitters and receivers for wireless communication.

A mobile controller that is carried in one hand, with one or more control members displaced by the other hand, provides a consistent, known reference frame (stabilized by the non-dominant hand) even while moving, e.g., walking, skiing, running, driving. For certain types of applications, for example inspection, security and cinematographic drone missions, a control member may be mounted on a platform that can be held or otherwise stabilized by the user's other hand. The platform may include secondary controls and, if desired, a display unit. In one example, all 6-DOF inputs of a controller having first control member with 3-DOF of movement and a second control member mounted to it with an additional 3-DOF of movement, can be reacted through the platform. With such an arrangement, this example of a control system facilitates movement through the air like a fighter pilot with intuitive (non-deliberate cognitive) inputs.

FIGS. 1A-1E depict a non-limiting example of a controller 110 that is configured for commanding an aerial drone, such as a quadcopter, though it can also be adapted for controlling other types of targets that move in multiple degrees of freedom. Controller 110 has a first control member 112, a joystick-like structure with three independent degrees of movement that is intended to be gripped by a user's hand, a second control member 116 mounted on the first control member for manipulation by a thumb or other digit on the hand of the user that is gripping the first control member, and an optional third control member, which enable a user to generate four independent control inputs for commanding movement of the drone in four degrees of freedom. A proximal end of control member 112 is pivotally connected to base 114 so that control member 112 can be independently pivoted along an x-axis and independently pivoted along a y-axis. In this example, the base is configured to be held by a user's hand. A base held by a user's hand provides a consistent, known reference frame (stabilized by the non-dominant hand) even while moving, e.g., walking, skiing, running, driving, can be used for inspection, security and cinematographic drone missions.

Installed or mounted on the base are additional input devices that are not used to command movement or orientation of the target, but other systems associated with the target. These input devices each comprise a control member that can be pressed, rotated, deflected or shifted by a finger of a person in one or two degrees of freedom to operate the controller and to issue additional control inputs to the drone and its various systems. The input devices include several buttons, dials, knobs, wheels and switches with one or two degrees of freedom. To achieve two degrees of freedom, a dial, knob or wheel, for example, can be depressed in addition to rotated. For example, flight sensitivity knob 130 sets the level of the sensitivity level of the movements of the hand controller movements by the user in order to increase or decrease the responsiveness of the drone to the movements. Programable button 140 that can be programed by the operator to perform a function desired by the operator when depressed. A controller on/off switch or button 142 is used to turn to the power to the hand controller on or off. Arm drone button 144 enables the drone. Return home button 146 causes the controller to transmit a command to the drone that causes the drone to return to a predesignated place autonomously.

The base houses signal conditioning circuits for the input devices, a processor for running software programmed processes, a battery or other source for power, interfaces for other hardware, and transmitters and receivers for wireless communication. Actuation or displacement of the input devices is sensed by circuits in the controller. In the case of input devices that are angularly displaced or rotated, the degree of angular rotation is sensed. Power indicator light 148 illuminates when the hand controller is on, and battery indicator 150 indicates the level of charge of the hand controller batteries.

Unmanned vehicles have a video camera for transmitting back to the remote operator. The video camera is mounted with the camera facing in a forward direction, so that when the vehicle moves forward the camera is pointing, usually, straight ahead in the direction of travel. The base includes manually-displaceable user interface elements for use by the controller to generate control inputs for a camera on the target, including a wheel 132 for changing camera settings, a paddle 134 for changing camera tilt, a button 136 for releasing a camera shutter, and button 138 for starting and stopping recording of video.

A rotating wheel 132 changes camera settings for the video camera or other sensor input, such as exposure or sensitivity, aperture, and resolution, or to select preset combinations of these settings. For example, the rotary wheel has a plurality of positions that allows a user to rapidly reconfigure the camera-related setting by selecting from several preconfigured settings. These parameters include the responsiveness of the platform or mount on the remote vehicle to commands to adjust (tilt and/or pan) the orientation or point of view (POV) of the camera (or sensor), or in the case of virtual object whose motion in a virtual environment is being commanded, the virtual POV of the virtual object, as well as the ability to toggle to other common camera features without diving deep into an app, such as zoom, shutter speed exposure compensation.

A button 136 for the shutter release causes a control input to be generated and sent the drone to take a photograph or series of photographs. Button 138 starts and stops recording of the video sent by the video camera. The video can be shown on a display (not shown) that is attached to mount 152 and arm 154. In on embodiment, a smartphone is used for displaying video in addition to setting up and modifying settings for the controller, as well as performing additional processes for the controller. The display or smartphone is connected by wire or wirelessly to the controller. In other embodiments, other display devices such as a tablet, computer, monitor, or standalone display could be substituted.

The base is of a size and shape that enables an operator or user to hold the base in one hand and operate the control members with the other hand. The placement of control members 116 and 118 onto the end of control member 112 allows an operator to operate control member 112 with the palm and two or three fingers of one hand while at the same time operating control member 116 and control member 118 with the thumb and the forefinger, respectively, of the same hand being used to operate control member 112. The operator's other hand 133, can be placed underneath the hand controller to support the hand controller and also to operate one or more additional inputs for controlling the camera with the fingers of the hand that is supporting the hand controller. This allows the operator to keep one hand on the control member 112 at all times during controlled repositioning of the target to generate control inputs in up to three degrees of freedom, while also being able to manipulate control member 116 (and, optionally 118) to generate control inputs for the target in additional degrees of freedom, hold the base, and operate a camera on the remote.

Aerial drones often have video cameras that offer tilting but not panning the camera with respect to the drone. Adjustment of the view of the camera from side to side is typically accomplished by rotating the facing of the drone. The drone is, in other words, rotated to pan the camera. Therefore, this example includes paddle 134 for controlling camera tilt that need only be deflectable in one degree of freedom. Displacement of the paddle 134 by deflecting it upwardly or downwardly causes generation of a command input to the remote target's control system that actuates a motor for a single axis camera tilt mechanism, with which a video camera is mounted to the drone.

The paddle 134 for commanding tilt is, in this example, located on the front of base 114 where an index or other finger of a hand holding the base can reach it. When an operator uses his or her hand to support base 114, the operator can reach and operate camera rotary control 132 with the thumb or forefinger of the same hand that is supporting base 114. The base is shaped to allow either right or left-handed use. Camera controls 136 and 138 for taking a photograph and starting and stopping video recording are located on the side of the base where they can also be reached by the thumb or other fingers of the hand holding the base.

Deflection of paddle 134 within a plane that is vertical with respect to the user's frame of reference when holding and operating the controller causes the controller to generate a control output for changing camera tilt. Deflecting downwardly causes generation and transmission of a control output to the target's control system to tilt the camera downwardly; deflecting it upwardly causes the controller to transmit a control output that results in the video camera being tilted upward.

In this example, the paddle 134 comprises part of an input device that pivots about a single axis. The paddle is a control member that a user can easily find by feel and deflect upwardly or downwardly. Deflection of the control pivots a mount or support, the angular displacement of which is sensed by the controller. The controller responds by generating a camera tilt rate command and communicating it on a signal transmitted to the target, the command indicating the direction and amount or degree of deflection. Alternatively, the controller issues an absolute command, meaning that the position of the input device corresponds to the position of the camera, sensor or POV.

The magnitude of the deflection upward or downward of the input device 134 determines the rate of adjustment that is communicated to the target's camera (or other sensor) control system, and the duration of the deflection determines the duration of the adjustment. In response to receiving a tilt rate command, a camera control system on the target operates a motor that pivots or moves the camera mount to tilt the camera in a direction, at a rate, and for a duration corresponding to the direction, magnitude and duration of displacement from the null position of the input device 134.

In one embodiment, the paddle 134 is biased toward a center position in its range of motion, which corresponds to a "null" or zero input position. This allows it to be deflected by a user's finger upwardly or downwardly and then released to return it to null or no-input by means of a centering spring force. This is a natural, intuitive, and comfortable movement for the user since upward motion corresponds to an upward adjustment in camera tilt and downward motion corresponds to downward adjustment of camera tilt. In an alternative embodiment, when generating an absolute command, the centering force may be omitted to allow the input device to remain in the position to which it is moved so that the camera/sensor/POV will also remain at that position.

In alternate embodiments, other shapes or configurations of control members could be substituted. For example, it could take the form of a toggle, wheel, or joystick that is mounted so that it is free to move in a vertical plane (with respect to a user when operating the controller in its intended manner), pivoting or rotating about an axis that is horizontal so that, during operations, the camera tilt input is vertical and thus intuitive for the pilot.

In one embodiment the input device comprising paddle 134 is, as previously mentioned, biased to the null position using a centering spring or other mechanism to generate a force. The magnitude of the force may vary with the magnitude of the deflection, thus providing a force-feedback mechanism. Passive mechanical, vibration haptic or active mechanical feedback to the user may also be incorporated. For example, haptic or tactile feedback may, optionally, be generated for the user when the input device leaves and/or returns to the null position.

Although the input device for commanding camera tilt need only be displaceable in one degree of freedom, it may also be implemented using a multi-axis mounting that supports pivoting of a control member in one degree of freedom that lies with a vertical plane relative to the user's frame of reference when the base is in its normal operating position with respect to the user, but with its other degrees of freedom locked or inactive.

If the target includes a camera mount with both tilt and pan capability, the input interface for cameral control input for the controller may be modified for displacement in two degrees of freedom. The input device would be capable of detecting the degree of angular displacement in each of two degrees of freedom independently, and the controller would respond by generating a control input for commanding tilt and a separate control input for commanding pan. In this embodiment (not shown), the input device is mounted on the base so that one degree of freedom lies within a plane that is oriented vertically with respect to the user's frame of reference when operating the controller, and a second degree of freedom is within a plane that is oriented horizontally with respect to the user's frame of reference. Deflection up and down of a control member, such as joystick, causes the input to generate a rate adjustment command for the camera mount to tilt the camera with respect to the target. Deflection from side-to-side causes the controller to generate rate adjustment command for the camera mount to pan the camera with respect to the target. Examples of control members for a two degree of freedom input device include not only a joystick, but also a paddle, button or other structure that is constrained to move two degrees of freedom. The two degree of freedom input device would, in one embodiment, be biased to return to a null or zero input position for both degrees of freedom using springs or similar mechanisms. In another embodiment, where absolute command of the camera pan and/or tilt is desired, the input device can be moved to the desired camera position and released without it returning to the null position tilt and/or pan.

In still other embodiments, a camera pan control may be added to the base. Except for its orientation, different embodiments of the pan control operate in the same way as the different embodiments of the tilt control described above operate. However, it could, optionally, look and/or feel differently so that it can be easily distinguished by touch and/or sight. The pan control is oriented so that deflection of the pan control is side-to-side or horizontal, and thus is natural, intuitive, and comfortable correspond to the pan of the camera. Thus, for example, the pan tilt control may be a paddle-type of input device like input device 134 for camera tilt, except instead of being configured so that control member is deflected up and down, it is oriented to be deflected from side to side to correspond with the side-to-side panning movement of the camera. However, it may be modified to generate absolute commands for positioning the pan of the sensor or POV, without the biasing force to recentering it to the null position upon release.

When a pilot establishes an intent to tilt the camera to track an object of interest, the pilot inputs a tilt command by deflecting the paddle 134 and then releasing it. The controller, in response, generates control input that is transmitted to the remote vehicle's onboard control system over a wireless communications channel. The control input comprises a rate command sent to the remote vehicle or target. The remote vehicle's onboard control system then causes the camera mount to tilt the camera at a rate and for duration that is proportionate to the magnitude and duration of the deflection of the paddle. If a control input is available for panning, the same process can be used with an input device that deflects from side-to-side, with the control input being issued to command the remote vehicle's onboard system to pan the camera.

The examples described above for controlling camera tilt and pan may also be used to steer other types of sensors—a still or video camera being one type of image sensor—that can be attached to a motor-controlled mount on the target and rotated in one or two degrees of freedom to tilt or pan the sensor relative to the frame of reference of the target.

Input devices for controllers of the type described above for generating control inputs to steer cameras or sensors can be characterized as being comprised of a control member that is supported by a mount that allows for the control member to be manually deflectable in one or two degrees of freedom, with the degree of deflection preferably measurable by one or more sensors in the mounting. Examples of mounts that can be used to support the control members include a single or multi-axis gimbal and a ball and socket joints. Examples of sensors that can be used to detect and, optionally, measure displacement of manually displaceable interface elements and control members include switches, inertial measurement units, potentiometers, optical encoders, Hall effect sensors, and the like. A processor within the controller responds to signals generated by the sensors and generates control inputs that are transmitted by radio frequency, optical or wired (electrical or optical) signals or a combination to the target.

Mechanisms that support measuring of angular displacement of control members to indicate displacement, such as gimbals, may optionally include springs for centering the control member and generating force feedback. Couplings or linkages that connect the joystick to a gimbal support, for example, could, in some embodiments, be made adjustable or adaptable to accommodate joysticks of different sizes for different sized users.

Figure 2A:
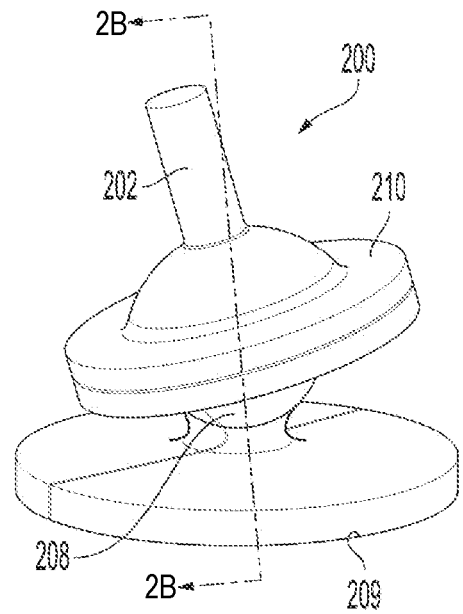
FIG. 2A is a perspective view of a two-axis gimbal.
Figure 2B:
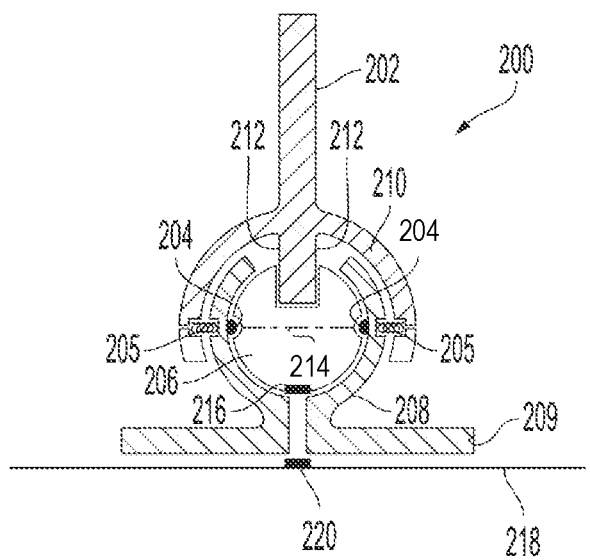
FIG. 2B is a cross-sectional view of the two-axis gimbal of FIG. 2A taken along section lines 2B-2B.

FIGS. 2A, 2B illustrate schematically a representative example of an implementation of a two-axis gimbal mount 200 that can be used as part of an input device for generating control inputs to command a camera or sensor steering system. The two-axis gimbal mount can be used to support simultaneous angular displacement and measurement of the angular displacement in two degrees of freedom but may be adapted by locking one degree of freedom to be used to support a control member for displacement in a single degree of freedom. The gimbal can be mounted in a base, such as base 114 (see FIGS. 1A-E). Its post 202 couples the gimbal mount to a control member. The control member pivots the post about two orthogonal axes that intersect at the center of the gimbal. One axis remains fixed relative to the base and the other rotates about the fixed axis. Two-axis gimbal mount 200 is a representative example of a two-axis gimbal that has been adapted to generate to haptic feedback upon the control member leaving and reentering a predefined null position for each of these two axes of rotation.

Furthermore, in an alternate embodiment in which the gimbal can be locked or blocked from rotation about one axis to allow only for rotation about one axis, the detents for generating force feedback for rotation about the locked or blocked axis could be omitted.

The gimbal is comprised of two members: one that remains fixed with respect to base or enclosure and second member that is constrained by the first member to rotate about a single axis or to rotate about each of two orthogonal axes, and to otherwise restrict relative rotation of the first and second members around any other axis. A post is coupled to the second member to pivot about each of the two orthogonal axes. If the second member is restricted to rotate only about one of the two orthogonal axes, the post is coupled with the second member so that it is can pivot about the second axis without rotating the second member. In this particular implementation, which is intended to be representative, a ball 206 is mounted within a socket 208. An extension 212 of the post fits within a complementary opening formed in the ball 206 so that angular displacement or pivoting of the post 202 also rotates the ball. In this example, the ball is retained within the socket so that it can freely rotate within the socket in two degrees of freedom, about each of two axes that are mutually orthogonal to each other, with one of the two axes remaining fixed relative to a base 209 of the gimbal mount. It may, optionally, be permitted to rotate about a third mutually orthogonal axis extending through the post. The base 209 is representative of a structure for mounting the gimbal, against which a control member may react.

A cap 210 that is connected with the post extends over a spherically-shaped outer surface of the socket 208 and has a complementary, spherical inner surface. Pivoting of the post moves the cap relative to the socket.

Although an inner surface of socket 208 can complement and support rotation of the ball 206, the ball 206 can, in alternative embodiments, be supported for rotation about one or both mutually orthogonal axes of rotation in other ways and by other means, including by one or more shafts or axles that support rotation of the ball relative to the socket. In such an alternative embodiment, the ball 206 and inside surfaces of the socket 208 need not be spherical or complementary.

This structure could be modified, or other structures could be substituted for the ball and socket, for a two-axis gimbal for supporting pivoting of the post 202 in two degrees of freedom. For example, the complementary opening in the ball in which extension 212 fits could be formed as a slot that allows the post to pivot about a fulcrum located within the slot that is aligned with a first one of the two orthogonal axes of rotation. Thus, it could pivot without rotating the ball. Rotation of the ball is constrained to allow for rotation only about a second one of the two orthogonal axis of rotation, which would then have a fixed position relative to base 209. Deflecting the post about the second axis of rotation would case the ball to rotate about the second axis.

To detect angular deflection of the post about each of the two axes of rotation, one or more magnets 216 are placed at the bottom of ball 206 (when in the null position.) This allows a printed circuit board (PCB) 218 with at least one Hall effect sensor 220 to be positioned closely to detect and measure angular displacement of the ball in up to two rotational degrees of freedom and thereby generate signals representative of the displacement. The Hall effect sensor is preferably a three-dimensional Hall effect sensor, in which case one is sufficient. One advantage to this arrangement is that the springs and the joystick are positioned higher up, keeping the bottom of the gimbal available for placement of a Hall effect sensor. Other types of sensors could be, in other embodiments, substituted for the Hall effect sensor and magnet, including optical encoders, potentiometers, and other types of sensors or detectors for detecting rotation of the gimbal about each of the axes.

The same gimbal support could be adapted to be used as part of an input device that moves only in one degree of freedom by locking one of the two axes temporarily, dynamically (based on the capabilities of the particular target being controlled or a mode of operation of the target or the camera), or permanently. Locking can be done physically by incorporating a structural feature that interferes with pivoting about one axis of rotation. For example, the socket 208 and ball 206 could be configured to lock the ball and socket in one axis of rotation, thus allowing relative rotation about only one of the two axes of rotation. Examples of such a lock include a pin that can be placed or selectively slid into and out of an interfering position or a latch that can be pivoted into and out of an interfering position, either selectively or permanently. Alternatively, at the time of making the gimbal, a component that allows for movement in one degree of freedom can be substituted with one that does not. In other embodiments the lock can be implemented with a magnet or electromagnet that provides sufficient resistance.

The gimbal mount 200 comprises a means for generating haptic feedback that is mechanical and comprises at least one detent for each degree of freedom. In this example, gimbal 200 comprises at least two detents 204 that cooperate with surface features on ball 206 located at the null position for one of the two degrees of freedom. The pair of detents and surface features interact to generate a mechanical force that can be felt when the post enters or leaves a null position for one axis of rotation. The other pair of detents are positioned orthogonally to the pair of detents 204 that can be seen. The detents generate a mechanical force feedback when entering and leaving a null or zero position when rotating about the other axis of rotation. A single detent could be used for each direction of rotation, but a pair provides balance.

The detents have a rounded or spherical engaging surface that is biased outwardly but displaceable inwardly once the biasing force is overcome. In this example, the detents are in the form of balls that are biased by springs 205, but other types of detents could be substituted. Only a pair of detents can be seen in the figures. The detents have one or more biasing springs mounted in a sleeve with a lip that retains the ball but allows it to extend.

A cap 210 is connected with the post 202 and comprises a cup-shaped member with a spherically shaped inner surface that complements a spherically shaped outer surface of socket 208. It is capable of pivoting in two degrees of freedom that correspond to the degrees of freedom in which the post 202 may pivot, the spherical inner surface rotating about the point where the two mutually orthogonal axes intersect when the post is pivoted.

In this example, all detents 204 engage the groove 214 when the ball is rotated to the null position in both directions of rotation. Instead of continuous groove 214, a small depression or dimple for each detent could be placed at the null position for each detent. The detents are all located in the same plane, which is normal to a central axis of the post 202. They are equally spaced at 90-degree intervals around the intersection of the central axis and the plane. When the post 202 is in a null position, one opposing pairs of detents is positioned so that the detents in that pair are colinear along a line that is parallel to one of the two orthogonal axes of rotation, and the other opposing pair of detents 204 are colinear along a line that is parallel to the other of the two orthogonal axes of rotation.

Instead of having the interfering surface features—the dimples or groove—on ball 206, an alternative embodiment may use the inner surface of the cap 210 and the outside of the socket 208 to support the detents and interfering surface features that interact to generate a haptic feedback when the post is moved from a predefined null position in each of the degrees of freedom.

A detent engaging and disengaging from the groove or other depression provides mechanical tactile feedback to a user at null positions in two axes of rotation. While the two-axis gimble mount is in the null position, each detent is aligned with a corresponding dimple or other type of recess, indentation, depression, groove, or surface feature. The surface feature is shaped to allow the detent to extend under its biasing force and thus interfere with the relative movement of the cap and socket. When a sufficient torque is applied by the post 202 to overcome the force created by the interference of the detent and the surface feature, the biasing force is overcome, and the detent is pushed inward to allow the relative movement. It remains pushed inward until it aligns again with a depression in the surface that allows it to extend. A deflection of the post 202 around each one of the axes of rotation will thus be met with at least some resistance, and the resistance will be felt as a haptic feedback to a user moving the post by moving a control member. Similarly, when the post 202 pivots back to a null position in one of the degrees of freedom the detents for that degree of freedom will extend into the recess. A user will feel the actuation force to relax subtly as the detent passes by one side of the wall of the recess that forms the dimple and extends into the dimple. The user may also feel the detent hitting the wall of the dimple on the other side of the dimple, reinforcing the user's sense that they're back at zero. The drop off in resistance is followed by a ramp up of resistance is the haptic cue that communicates to the user that the null position for that degree of freedom has been reached without having to look or to find the null position, such as by releasing the control member and allowing it to return under a spring force to the null position. This can be of advantage in many applications, particularly those in which the user is mobile.

Referring back to FIGS. 1A-E, controller 110 will generate control inputs to the target in four degrees of freedom but can be adapted or configured to generate control in up to any number of degrees of freedom up to six degrees of freedom. Controller 110 has a first control member 112 with three independent degrees of movement that is intended to be gripped by a user's hand. A proximate end of control member 112 is pivotally connected to base 114 so that control member 112 can be independently pivoted along an x-axis and independently pivoted along a y-axis. Pivoting control member 112 along the x-axis tilts the moves the distal end of control member 112 side to side, relative to base 114. Pivoting control member 112 along the y-axis pivots the distal end of control member 112 forward and backward relative to base 114. Control member 112 could be made to pivot along only the x-axis or y-axis or may simultaneously pivot around both the x and y axes. The pivotal connection between control member 112 and base 114 may be made by a number of pivoting type connections, such as a gimble or a ball and socket. The controller is also moveable in a third degree of freedom by twisting it around a z-axis that is orthogonal to the x and y axes. The first control member thus displaceable in three degrees of freedom, each of which can be used to generate three, independent control inputs for commanding three degrees of freedom of movement of the target.

A fourth degree of movement and of freedom is provided by control member 116 located on a distal end of control member 112. Control member 116 in this example is a thumb displaceable along the z-axis by operator's thumb is placed onto the base of control member 116 and retained by thumb catch 122. Thumb catch 122 is adjustable to accommodate the size of a particular user's thumb so that movement of the user's thumb will be translated into movement of control member 116. Control member 118 is a trigger style control member that may be operated by a user's index finger on the same hand that is gripping the first control member. The control member 116 and control member 118 are linked to move in opposition to one another generate a fourth control input. An operator uses the operator's thumb and control member 116 to move control member 116 downward by pressing down with the user's thumb. A user may move control member upward by raising the user's thumb which is retained by thumb catch 122, which is connected to control member 116. An operator may also move control member 116 upward by squeezing control member 118. The cooperation between control member 116 and control member 118 may be accomplished in any number of ways, including using a direct, mechanical linkage or by actuators. In alternative embodiments, control member 118 can be omitted or not linked to control member 118, in which case it can be used for other purposes.

This controller could be adapted in alternative embodiments to allow for different degrees of freedom of displacement for each of its first and second control members. For example, the second control member can be allowed to be displaced by a user's thumb or index finger in two additional degrees of freedom so that the controller can be displaced in six degrees of freedom with single hand and thus generate six independent control inputs. In alternate embodiments, displacement of the third control member could be used to generate another control input and not be linked to the second control member. Many control scenarios may benefit from being able to provide rotational and translational movement using a single hand, even if fewer than all control outputs for all six degrees of freedom are required. The unused degrees of freedom could be locked out temporarily or permanently.

Hand controller 110 also comprises display 124 on an extension 120 at the top of the controller. The extension allows the display to be better oriented toward the operator, so the operator may operate the hand controller and observe display 124 at the same time. It also allows for accommodation of second control member 116. Display 124 is used to provide situational awareness information to the operator regarding the device being controlled by the hand controller. In this example, the display includes a direction-to-target indicator 126 is comprised of a series of display elements arranged in a half circular pattern that corresponds to the 180-degree arc directly in front of the hand controller. Direction-to-target indicator 126 indicates the direction of the drone from the hand controller by illuminating the light that corresponds to the relative direction of the drone from the hand controller. The display also comprised of target orientation indicator 128. Target orientation indicator 128 indicates the orientation or heading of the target relative to the hand controller. A mobile, two-handed controller system like the one described above is capable of providing a consistent, known reference frame (stabilized by the non-dominant hand) even while moving, e.g., walking, skiing, running, driving. For certain types of applications, for example inspection, security and cinematographic drone missions, a hand controller may be mounted on a platform that can be held or otherwise stabilized by the user's other hand. The platform may include secondary controls and, if desired, a display unit. In one example, all 6-DoF inputs of a controller, having first control member with 3-DOF of movement and a second control member mounted to it with an additional 3-DOF of movement, can be reacted through the platform. With such an arrangement, this example of a control system facilitates movement through the air like a fighter pilot with intuitive (non-deliberate cognitive) inputs.

U.S. patent application Ser. Nos. 13/797,184, 15/071,624, 15/964,064 and 16/114,190, which are incorporated herein by reference for all purposes, disclose several examples of controllers that allow a single hand of an operator to generate control inputs in more than three, and up to six, degrees of freedom (6-DoF), simultaneously and independently. Various aspects of the single-handed controllers described in these applications better enable users, whether they are in motion or at rest (such as computer augmented or virtual reality gamers, pilots, hikers, skiers, security/SAR personnel, war-fighters, and others, for example) to control an asset or target in physical and/or virtual three-dimensional space, by generating control inputs while also limiting cross-coupling (unintended motions). A controller with these features can be used to allow the controller to decouple translation (movement in physical space, or X, Y and Z directions) from attitude adjustments (reorientation in pitch, yaw and roll) in the control requirements of computer aided design, drone flight, various types of computer games, virtual and augmented reality and other virtual and physical tasks where precise movement through space is required such as fixed wing and rotary wing flight, aerial refueling, surgical robotics, terrestrial and marine robotic control, and many others. The aspects described above can be adapted for use with the embodiment described in the referenced applications.

The base may, optionally, incorporate additional manually displaceable user interface elements such as keys, buttons, dials, touchpads, trackpads, track balls. By locating the first control member midline to the controller off-axis moments are reduced and making it symmetric allows for use with either hand. However, the base could be made asymmetric. It could also be modified to allow reconfiguration for either hand with a quick disconnect for the joystick and two mounting points. In other embodiments, rather than having a user hold the base, the base could be configured to be stabilized by mounting the base to the user's body. Example of mounting points for a base on a user's body include a chest mount, a belt, and an article of clothing.

Variations may be made in the above without departing from the scope of the invention. While specific embodiments have been shown and described, modifications can be made by one skilled in the art without departing from the spirit or teaching of this invention. The embodiments as described are exemplary only and are not limiting. Many variations and modifications are possible and are within the scope of the invention. Furthermore, one or more elements of the exemplary embodiments may be omitted, combined with, or substituted for, in whole or in part, with one or more elements of one or more of the other exemplary embodiments. Accordingly, the scope of protection is not limited to the embodiments described, but is only limited by the claims that follow, the scope of which shall include all equivalents of the subject matter of the claims.

The invention claimed is:

1. A controller for remotely controlling movement of a target having a point of view (POV), the controller comprising:
   a base shaped to be supported by a user when controlling movement of the target, the base having an intended orientation with respect to the user when being held during operation of the target;
   a manually-displaceable control member mounted to the base in a position for allowing manually displacement by a hand of the user for generating control inputs to command movement of the target; and
   an input device coupled to the base and manipulatable (1) in a first manner with respect to the base, causing the controller to generate a tilt command to tilt the POV up or down with respect to the target, and (2) in a second manner with respect to the base, causing the controller to generate a pan command to pan the POV side to side with respect to the target.

2. The controller of claim 1, wherein the first manner is up and down, and the second manner is side to side.

3. The controller of claim 1, wherein the input device is a mechanical input device.

4. The controller of claim 1, wherein the input device is a first input device, the controller further comprising a second input device manipulatable to cause the controller to generate a zoom command to zoom the POV in or out with respect to the target.

5. The controller of claim 4, wherein the second input device is a mechanical wheel.

6. The controller of claim 4, wherein the second input device is disposed on the base.

7. The controller of claim 1, wherein the input device is configured to be depressed to issue an additional command to the target.

8. The controller of claim 1, wherein the input device is biased to a center position from which it can be manipulated and, when released, return to the center position, the center position corresponding to a null input.

9. The controller of claim 1, wherein the tilt command is a rate command proportionate to an amount of manipulation.

10. The controller of claim 1, wherein the first input device is a mechanical wheel.

11. The controller of claim 1, wherein the input device is disposed on a front end of the base.

12. The controller of claim 1, wherein the input device is configured to be manipulated by an index finger of the user.

13. The controller of claim 1, wherein the hand of the user is a first hand, the base being shaped to be held by a second hand of the user when controlling movement of the target.

14. The controller of claim 1, wherein the base is configured to be mounted to a body of the user.

15. The controller of claim 1, wherein the base is configured to be mounted to a body of the user via at least one of a belt, a chest mount, or an article of clothing.

16. A non-transitory processor-readable medium storing code representing instructions to be executed by a processor, the code comprising code to cause the processor to:
  generate a control input at a controller to remotely command movement of a target having a point of view (POV), the controller having a base shaped to be supported by a user when controlling movement of the target, and a manually-displaceable control member mounted to the base in a position for allowing manual displacement by a hand of the user for generating the control input, the control input being generated based on displacement of the control member relative to the base;
  send the control input to the target to cause movement of the target;
  generate a tilt command to tilt the POV up or down with respect to the target, in response to manipulation of an input device that is coupled to the base; and
  send the tilt command to the target to tilt the POV up or down with respect to the target.

17. The non-transitory processor-readable medium of claim 16, the code further comprising code to cause the processor to:
  generate a pan command to pan the POV side to side with respect to the target, in response to manipulation of the input device; and
  send the pan command to the target to tilt the POV side to side with respect to the target.

18. The non-transitory processor-readable medium of claim 16, wherein the manipulation of the input device includes up or down movement of the input device relative to the base.

19. The non-transitory processor-readable medium of claim 18, wherein the manipulation of the input device is a first manipulation of the input device, the code further comprising code to cause the processor to:
  generate a pan command to pan the POV up or down with respect to the target, in response to a second manipulation of the input device, the second manipulation including side to side movement of the input device relative to the base; and
  send the pan command to the target to tilt the POV side to side with respect to the target.

20. The non-transitory processor-readable medium of claim 16, wherein the input device is a first input device, the code further comprising code to cause the processor:
  generate a zoom command in response to manipulation of a second input device of the controller; and
  send the zoom command to the target to zoom the POV in or out with respect to the target.

21. The non-transitory processor-readable medium of claim 20, wherein the second input device is a mechanical wheel.

22. The non-transitory processor-readable medium of claim 16, wherein the tilt command is a rate command proportionate to an amount of manipulation.

23. The non-transitory processor-readable medium of claim 16, wherein the hand is a first hand, the base being shaped to be held by a second hand of the user when controlling movement of the target.

24. The non-transitory processor-readable medium of claim 16, wherein the base is configured to be mounted to a body of the user.

* * * * *

UNITED STATES PATENT AND TRADEMARK OFFICE
CERTIFICATE OF CORRECTION

Page 1 of 1

PATENT NO. : 11,199,914 B2
APPLICATION NO. : 16/858217
DATED : December 14, 2021
INVENTOR(S) : Scott Parazynski et al.

It is certified that error appears in the above-identified patent and that said Letters Patent is hereby corrected as shown below:

In the Claims

At Column 14, Claim number 10, Line number 54, please delete "wherein the first input" and insert -- wherein the input --

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*